United States Patent
Yang et al.

(10) Patent No.: US 6,336,337 B1
(45) Date of Patent: Jan. 8, 2002

(54) MULTI-STAGE COMPRESSOR PUMP DRIVING SYSTEM FOR AIR CONDITIONING AND REFRIGERATION APPLICATIONS

(76) Inventors: Tai-Her Yang, No. 59, Chung Hsing 8 St., Si-Hu Town, Dzan-Hwa; Yang Chen, 3F, No. 21, Lane 20, Chung Chang N. Rd., Sanchung City, Taipei Hsien, both of (TW)

( * ) Notice: Subject to any disclaimer, the term of this patent is extended or adjusted under 35 U.S.C. 154(b) by 0 days.

(21) Appl. No.: 09/379,568

(22) Filed: Aug. 24, 1999

(51) Int. Cl.[7] ................................................ F25B 49/00
(52) U.S. Cl. .............................. 62/236; 62/230; 62/160
(58) Field of Search .......................... 62/236, 230, 160

(56) References Cited

U.S. PATENT DOCUMENTS

| | | | | |
|---|---|---|---|---|
| 3,604,217 A | * | 9/1971 | Spear ........................... 62/268 |
| 3,656,540 A | * | 4/1972 | Henrici ........................ 165/1 |
| 3,668,883 A | * | 6/1972 | Ruff et al. .................... 62/158 |
| 3,691,785 A | * | 9/1972 | Ruff et al. .................... 62/230 |
| 3,841,108 A | * | 10/1974 | Pierrat ......................... 62/236 |
| 4,151,725 A | * | 5/1979 | Kountz et al. ................. 62/182 |
| 4,364,237 A | * | 12/1982 | Cooper et al. ................. 62/160 |
| 4,494,382 A | * | 1/1985 | Raymond ...................... 62/160 |

* cited by examiner

Primary Examiner—Henry Bennett
Assistant Examiner—Mark Shulman
(74) Attorney, Agent, or Firm—Bacon & Thomas

(57) ABSTRACT

A multi-stage driven type compressor pump driving system for air conditioning and refrigeration applications, a multi-stage driving structure other than a variable frequency stage-less driving structure to lower costs and improve electromagnetic compatibility (EMC) without loss of function relative to the variable frequency system.

17 Claims, 5 Drawing Sheets

MULTI-STAGE COMPRESSOR PUMP DRIVING SYSTEM FOR AIR CONDITIONING AND REFRIGERATION APPLICATIONS

BACKGROUND OF THE INVENTION (a) Field of the Invention

The invention relates to an innovative design of a multi-stage compressor pump driving system for air conditioning and refrigeration applications, and in particular to a multi-stage driven-type system which replaces the conventional variable frequency stage-less driving structure in order to lower costs and provide improved electromagnetic compatibility (EMC), while still providing similar functions to those of the variable frequency driving system.

(b) Description of Related Art

In recent years, variable frequency type motors have been commonly utilized in home appliances such as refrigerators and air conditioners to obtain the following effects:

1. Refrigerator: The motor is controlled by the variable frequency power source to provide variable speed operation and thereby drive the compressors at varying speeds. For example, high speed operation may be used to shorten the temperature reducing time, and low speed operation to maintain a constant temperature status, reduce noise, and save power consumption.
2. Air conditioning: The motor is also controlled by the variable frequency power source for variable speed operations, for example by driving the motor at a higher frequency to further drive the compressor for high speed operations and shorten the temperature reducing time, or by driving the motor at a lower frequency so that the temperature has less pulsation changes and to lower the noise and save power consumption.

Even though the above said functional effects are all positive, the high cost of the variable frequency type driven motor and its control devices, as well as the electromagnetic compatibility (EMC) of the variable frequency driving controller have made the circuit more complicated and costly. The high price discourages purchases, prevents people from taking advantage of all of the positive effects of power saving, convenience and low noise.

SUMMARY OF THE INVENTION

The main purpose of the invention is to provide a multi-stage compressor pump driving system for air conditioning and refrigeration applications having a lower cost and improved electromagnetic compatibility (EMC) while providing functions similar to those of the variable frequency type driving system.

DETAILED DESCRIPTION OF THE PREFERRED EMBODIMENTS

Figure 1:
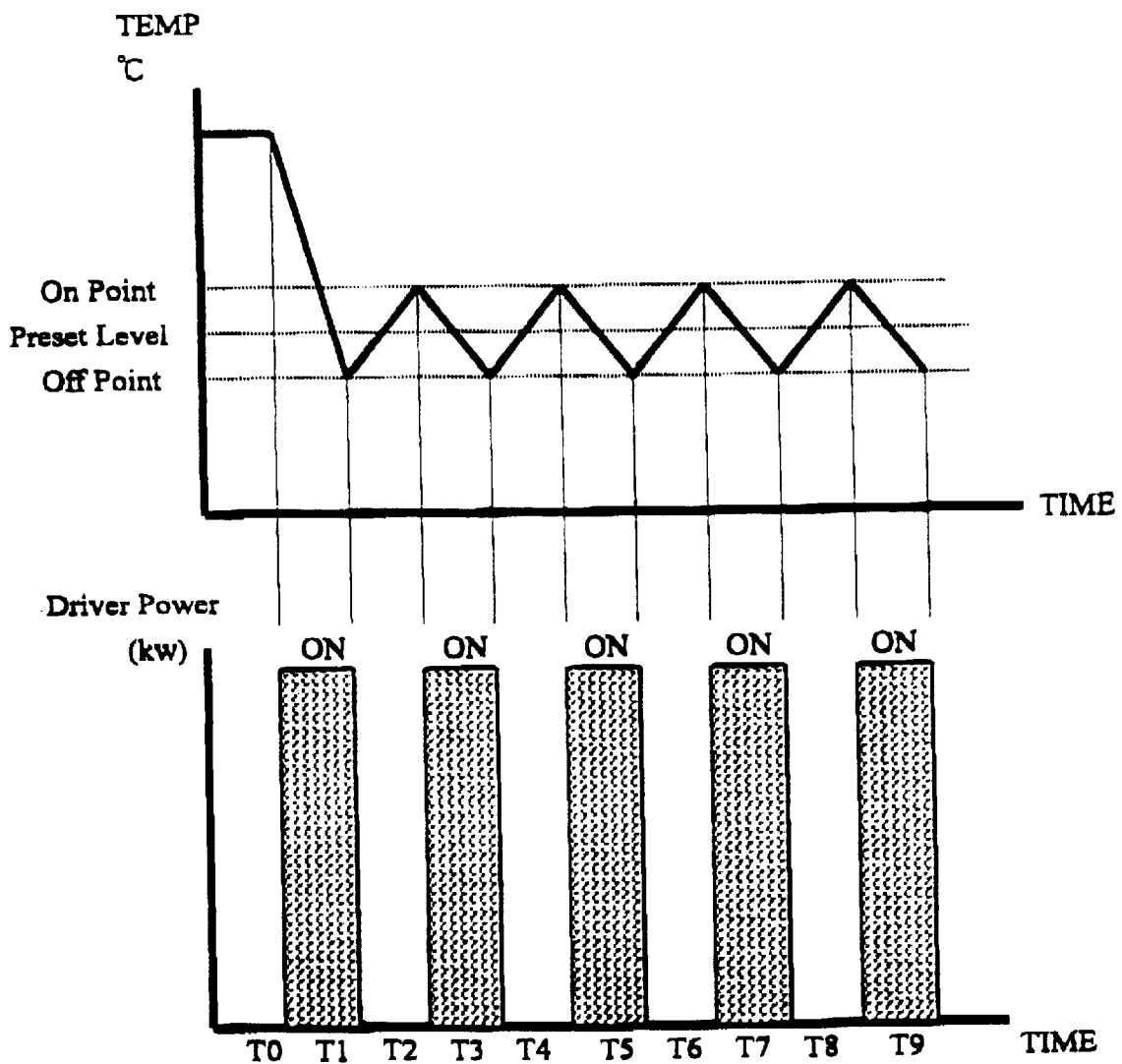
FIG. 1 is a graph showing the relationship between compressor pump driving operation and target temperature for conventional power driven air conditioning or refrigeration devices.
Figure 2:
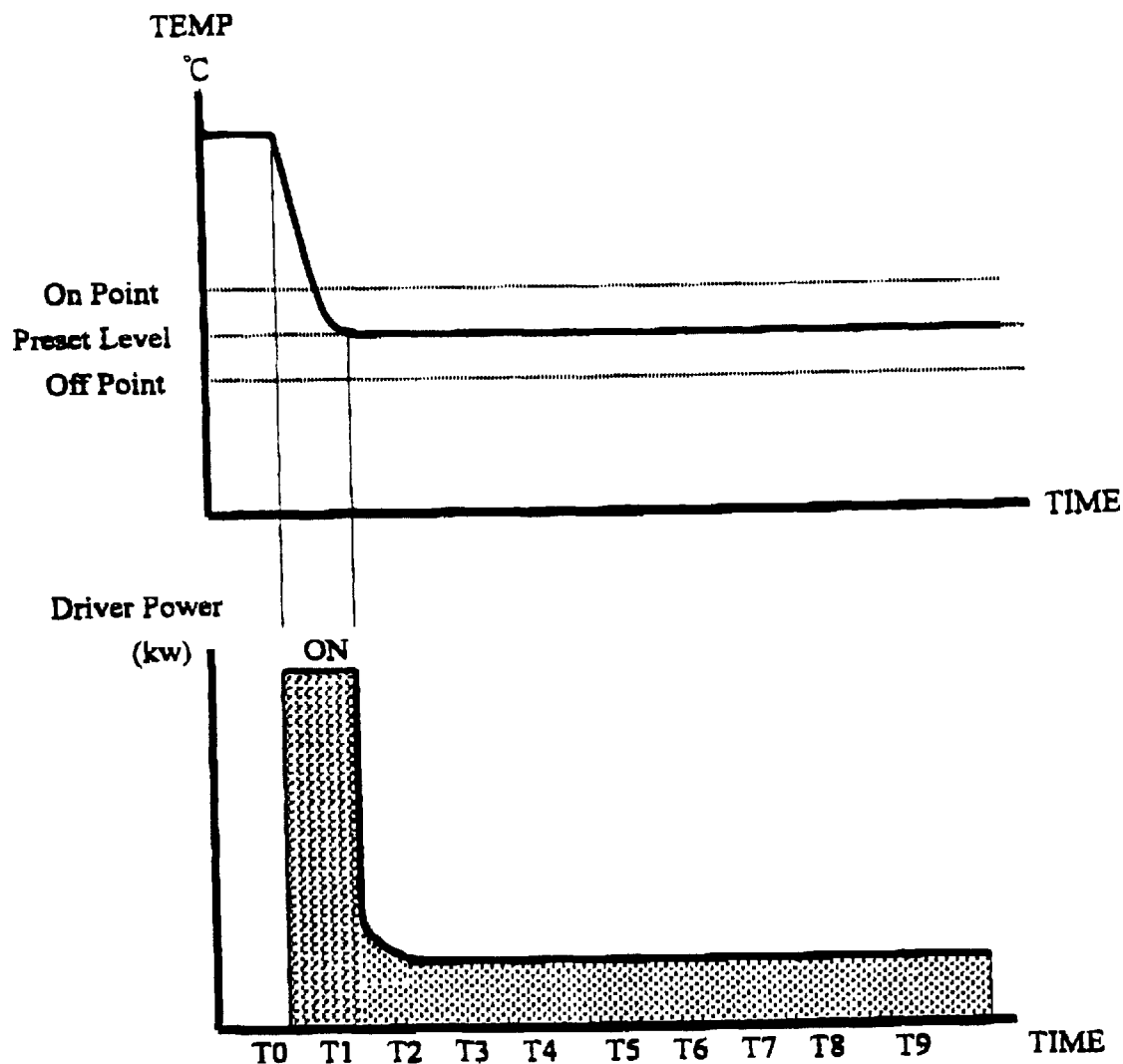
FIG. 2 is a constant temperature operating mode diagram of a newer commercially available variable frequency type driven system.

The relationship between driving operation and target temperature for the conventional power driven air conditioning or refrigeration devices is shown in FIG. 1. Only a single speed compressor pump is used for the intermittent operating mode of instant cooling operation and stoppage to provide a temperature adjusting function. Therefore, for a preset temperature operation, the single motor used in the intermittent operation tends to consume more power with high compressor noise, and is subject to large temperature variations which causes discomfort. On the other hand, the existing commercially available newer model variable frequency driving system uses a lower rotating speed for variable speed operation, which advantages of stable temperature, low compressor noise and motor power savings. Its operating mode is as shown in FIG. 2, but the variable frequency type driving method has not attained widespread use due to its complicated system, high price and electromagnetic compatibility (EMC) problems. The multi-stage compressor pump driving system of the invention is designed to find a trade-off between the market acceptable price level and good performance requirements. It has multi-stage operating functions and a related particular structure capable of being controlled to provide a high power rate high rotating speed operation or a low power rate low rotating speed operation in a preset temperature operation mode. The preferred driving system has the following three selectable preset temperature operating modes:

A. Low speed support operating mode: If the BTU value of the low power rate low rotating speed driven compressor pump is smaller than the required make-up BTU value for target temperature, then the system is first operated at a high power rate high rotating speed, and after the temperature is lowered to reach the preset detecting temperature, the motor is controlled for low rotating speed low power rate operation to provide a temperature adjusting driving mechanism operation. The low power rate low rotating speed operation is used to maintain a constant temperature, while the high speed high power rate operation times are reduced to effectively smooth out temperature variations as well as to save power consumption and reduce noise.

B. Low preset temperature operating mode: If the BTU value of the low power rate low rotating speed driven compressor pump is smaller than the required make-up BTU value for target temperature, then after the preset temperature is reached, the low power rate low rotating speed operating function is used to perform periodic adjusted temperature change along the temperature average line to save power and to reduce noise.

Figure 3:
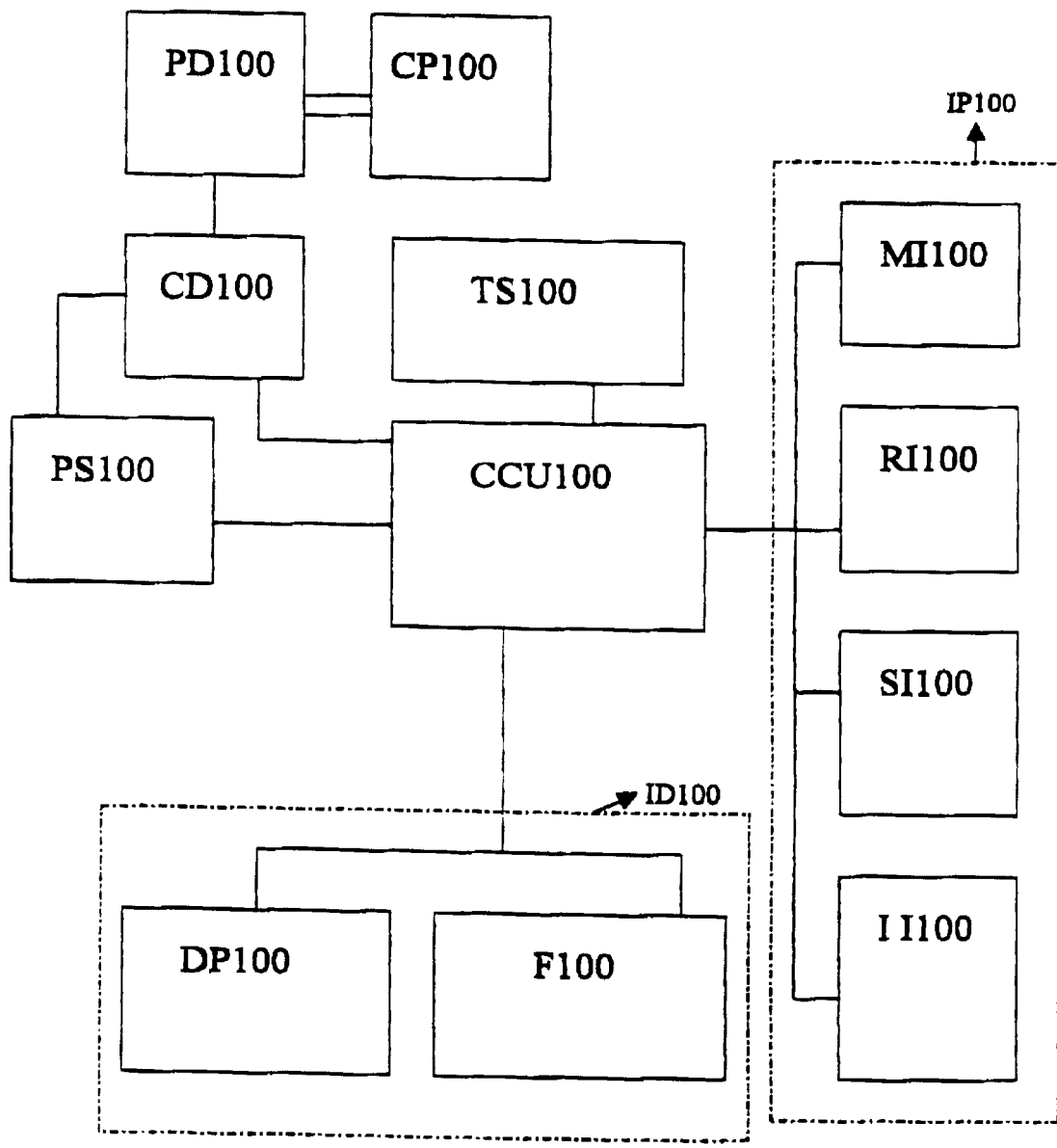
FIG. 3 is a block diagram of a multi-stage compressor pump driving system for air conditioning and refrigeration applications according to a preferred embodiment of the invention.

C. Conventional single stage high rotating speed driving system operating mode: A block diagram of the multi-stage driven type compressor pump driving system for air conditioning and refrigeration applications of the invention is shown in FIG. 3. The system includes the following:

A power source PS100 including a single phase or multi-phase AC power source or DC power source for supplying power to the primer driving motor, motor driving control circuit, fan driving motor and related control circuit, central controller, input circuit, display circuit and other peripheral devices of the compressor pump driving device;

A compressor pump CP100 driven by the compressor pump driving device to perform a compression function on the coolant.

A compressor pump driving device PD100 which has the following characteristics:

1) It can be driven directly by an AC motor for two-stage or more than two-stage rate speed operation without changing the power source voltage and frequency, by switching the number of winding poles or switching the winding wiring to change the impedance, by switching the series combined impedance of a single phase or multi-phase motor, or by switching the Y-Δconnection of a three-phase motor; or it can be driven through a speed reducer mechanism with a fixed speed ratio;

2) It can be driven directly by a DC motor for two-stage or more than two-stage rated speed operation by switching the winding wiring to change the field strength or to change the impedance of the field or the armature, or it can be driven through a speed reducer mechanism with fixed speed ratio;

3) The compressor pump may be driven by an AC or DC motor output shaft combined with a staged or stage-less variable speed mechanism, and may include a directly or indirectly power controlled clutch to switch the speed ratio of the staged or stage-less variable speed mechanism to relatively change the operating speed of the compressor pump; or 4) The driving device may be constituted by two or more than two AC or DC motors with different rated rotating speeds and different power requirements, the two motors being alternatively operated at different rotating speeds and different power rates;

A driving control device CD100 constituted by electromechanical devices or solid state electronic components and controlled by the central controller to relatively control the output rotating speed of the compressor pump driving device;

A central controller CCU100 made up of an analog or digital control circuit which is constituted by electromechanical devices or solid state electronic components, and which receives a wired or wireless systematic control signal or preset signal from the manual input device MI100 or manual remote control device RI100, as well as a detected signal from temperature or humidity detector devices TS100, etc. to further control, through the control driving device CD100, the compressor pump driving device;

An input operating device IP100 constituted by electromechanical devices or solid state electronic components which includes:

1) a manual input device M100;
2) a wired or wireless manual remote control input device RI100;
3) a wired or wireless system input operating device SI100; and/or
4) an internal preset automatic control device II100, the input operating device being selectively constituted by one or more than one of the aforesaid 1)–4) input operating devices for temperature preset or other functions and operations.

An environment detector device TS100 made up of a temperature and/or humidity detector device constituted by electromechanical or solid state electronic components for detecting a target temperature and/or humidity and transmitting a control signal to the central controller unit CCU100 to provide a corresponding control.

Figure 4:
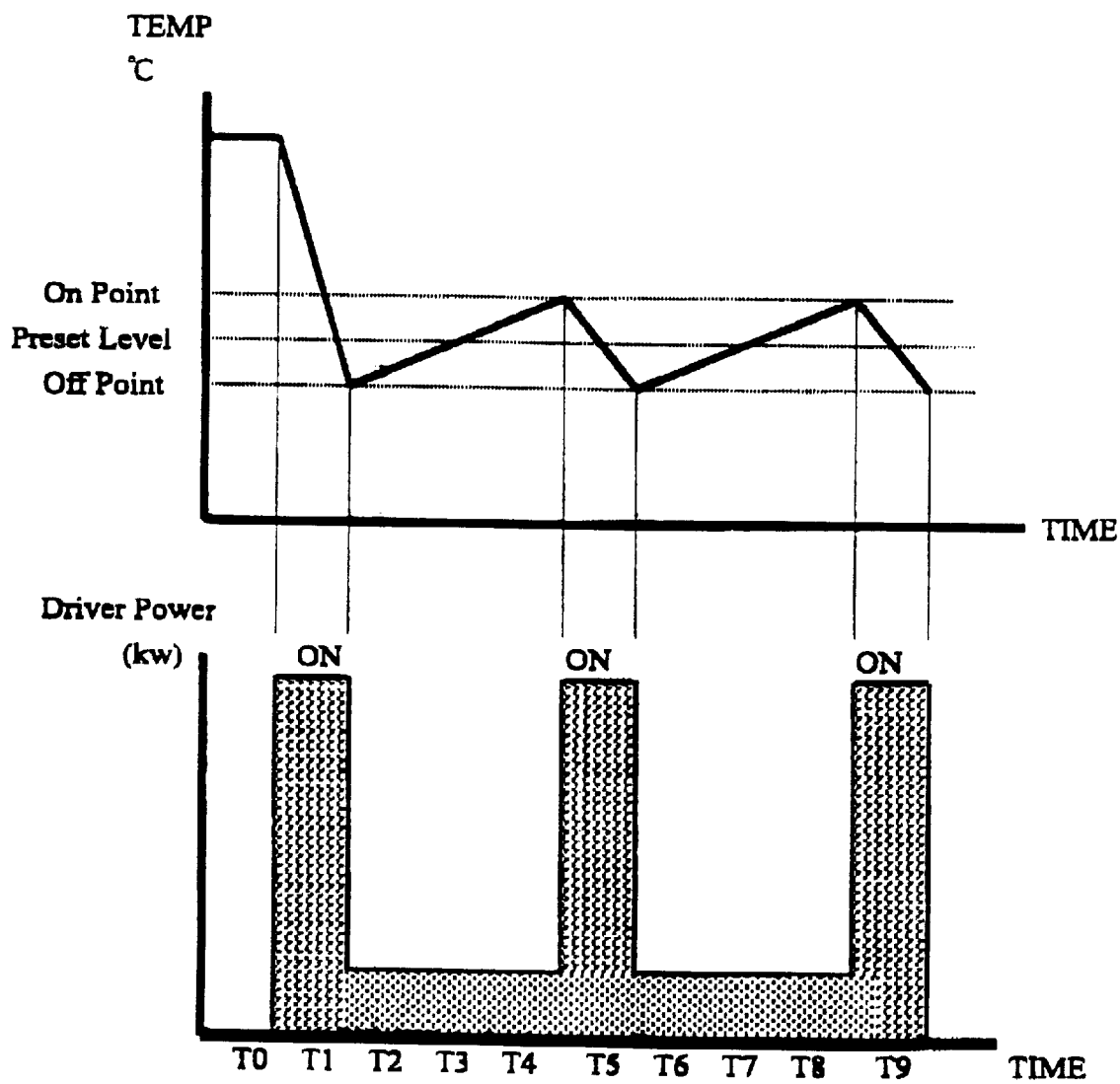
FIG. 4 is a low speed support operating mode diagram of the preferred multi-stage driven type compressor pump driving system for air conditioning and refrigeration applications.

The operating mode of the system shown in FIG. 3 is as follows:

1) Low speed support operating mode: When the target surrounding temperature is higher than the ON point of the preset level (i.e., if the temperature is higher than this value), the compressor pump is driven by the compressor pump driving device to the high power rate high speed OFF point of the preset level (i.e., the conventional single speed compressor pump is stopped if this temperature value or a lower value is reached). The compressor pump is then switched to low power rate low speed operation, and if the target temperature is further lowered, the pump is stopped. If the target temperature is slowly increased to the ON point of the preset level when the pump is driven at a low power rate and low speed, the compressor pump is switched to high power rate high speed operation to lower the target surrounding temperature to the OFF point of the preset level, and then is further switched to low power rate low speed to drive the compressor pump. The cyclic operations are continued in the same manner so long as medium target temperature loss operation is required. FIG. 4 is a schematic diagram of the invention in the low speed support operating mode.

Figure 5:
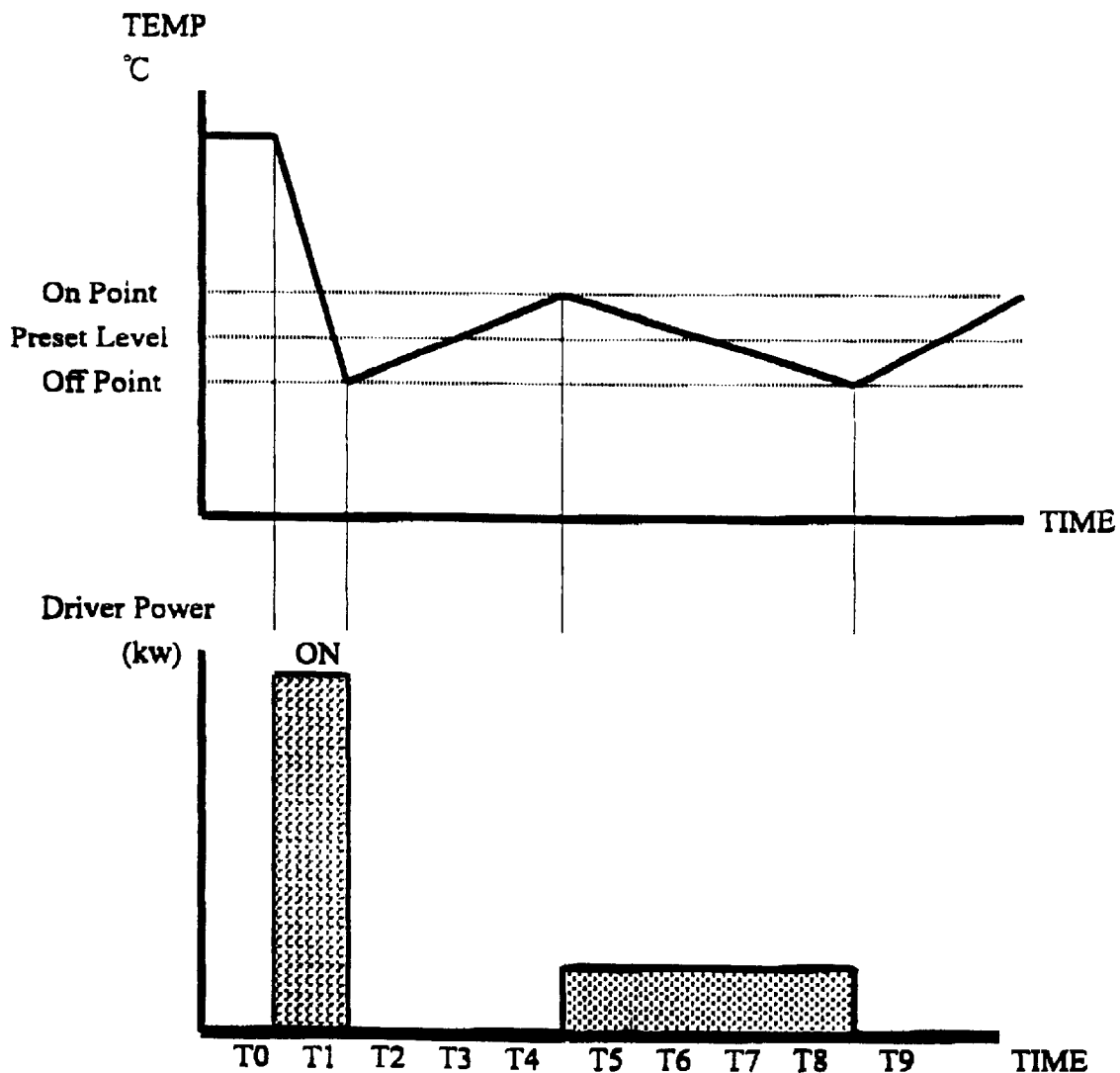
FIG. 5 is a low speed constant temperature operating mode diagram of the preferred multi-stage compressor pump driving system for air conditioning and refrigeration applications.

2) Low speed constant temperature operating mode: When the target surrounding temperature is higher than the ON point of the preset level (i.e., if the temperature is higher than this value), the compressor pump is driven by the compressor pump driving device to the high power rate high speed OFF point of the preset level (i.e., the conventional single speed compressor pump is stopped if this temperature value or lower value is reached). The compressor pump is then switched to low power rate low speed operation, and if the target temperature is further lowered, the pump is stopped. If the target temperature is slowly raised to the ON point of the preset level when the pump is stopped, then the compressor pump is switched to low power rate low speed operation to lower the target surrounding temperature to the OFF point of the preset level, and is further switched to a low power rate and low speed to drive the compressor pump, the cyclic operations being continued so long as a slower target temperature loss operation is required. FIG. 5 is a schematic diagram of the invention during low speed constant temperature operation.

3) For a larger target surrounding temperature loss, the driving device is operated according to a conventional single stage high rotating speed driving system mode.

When the multi-stage compressor pump driving system for air conditioning and refrigeration applications is applied to air conditioners, the following interface devices are further installed:

An interface driving circuit ID100 constituted by electromechanical devices or solid state electronic components to receive the operating signals of the central controller unit CCU100 and control the operating time of the air conditioners and the fan F100 to provide startup, stopping, or variable speed operations and wind direction controls as well as to drive the display device DP100 or other interface devices.

As summarized from the above description, the multi-stage compressor pump driving system for air conditioning and refrigeration applications of the invention includes a compressor pump driving device capable of driving the compressor pump through multi-stage rotating speed operations and particular interactive operations according to a preset target temperature, thereby obtaining the advantages of low noise and power saving, its cost being greatly reduced with respect to existing variable frequency systems, and better electromagnetic compatibility (EMC) to increase its practical usefulness.

What is claimed is:

1. A multi-stage compressor pump driving system for air conditioning and refrigeration applications, comprising:
   a power source;
   a compressor pump;
   a multi-stage compressor pump driving device connected to receive power from said power source and to drive said compressor pump at discrete, non-continuously-variable speeds,
      wherein said compressor pump driving device is arranged to selectively drive said compressor pump in at least two stages,
      wherein during a first of said at least two stages, said driving device drives said compressor pump at a first predetermined speed, and
      wherein during a second of said at least two stages, said driving device drives said compressor pump at a second predetermined speed higher than said first predetermined speed;
   a driving control device connected to said compressor pump driving device and arranged to select one of said two predetermined speeds of said compressor pump driving device;
   a control input device;
   an environmental detection device; and
   a central controller connected to said driving control device, said control input device, and said environmental detection device, said central controller being arranged to control said driving control device in response to differences between a selected temperature signal received from said control input device and an actual temperature signal received from said environmental detection device.

2. A multi-stage compressor pump driving system for air conditioning and refrigeration applications as claimed in claim 1, wherein said driving device is an AC motor having a constant voltage and frequency, wherein said first and second predetermined speeds are obtained by switching a number of winding poles.

3. A multi-stage compressor pump driving system for air conditioning and refrigeration applications as claimed in claim 1, wherein said driving device is an AC motor having a constant voltage and frequency, wherein said first and second predetermined speeds are obtained by switching a winding wiring to change an impedance of the motor.

4. A multi-stage compressor pump driving system for air conditioning and refrigeration applications as claimed in claim 1, wherein said driving device is an AC motor having a constant voltage and frequency, wherein said first and second predetermined speeds are obtained by switching a series-combined impedance in the motor.

5. A multi-stage compressor pump driving system for air conditioning and refrigeration applications as claimed in claim 1, wherein said driving device is a three-phase AC motor having a constant voltage and frequency, wherein said first and second predetermined speeds are obtained by switching a delta-wye connection of the motor.

6. A multi-stage compressor pump driving system for air conditioning and refrigeration applications as claimed in claim 1, wherein said driving device includes an AC motor driven at a constant speed and a speed reducer mechanism having a fixed speed ratio that determines said first and second predetermined speeds.

7. A multi-stage compressor pump driving system for air conditioning and refrigeration applications as claimed in claim 1, wherein said driving device includes a DC motor and said first and second predetermined speeds are obtained by switching a wiring of said motor to change a field strength.

8. A multi-stage compressor pump driving system for air conditioning and refrigeration applications as claimed in claim 1, wherein said driving device includes a DC motor and said first and second predetermined speeds are obtained by changing an impedance of a field winding of an armature of said motor.

9. A multi-stage compressor pump driving system for air conditioning and refrigeration applications as claimed in claim 1, wherein said driving device includes a DC motor and a speed reducer mechanism having a fixed speed ratio that determines said first and second predetermined speeds.

10. A multi-stagce compressor pump driving system for air conditioning and refrigeration applications as claimed in claim 1, wherein said driving device includes a motor and a power controlled clutch aranged to switch a speed ratio of a variable speed mechanism on an output shaft of the motor.

11. A multi-stage compressor pump driving system for air conditioning and refrigeration applications as claimed in claim 1, wherein said driving device includes two different motors, a first of which operates at said first predetermined speed and a second of which operates at said second predetermined speed.

12. A multi-stage compressor pump driving system for air conditioning and refrigeration applications as claimed in claim 1, wherein said control input device is manual input device.

13. A multi-stage compressor pump driving system for air conditioning and refrigeration applications as claimed in claim 12, wherein said manual input device is a remote control device.

14. A multi-stage compressor pump driving system for air conditioning and refrigeration applications as claimed in claim 1, wherein said selected temperature signal a systemic control signal.

15. A multi-stage compressor pump driving system for air conditioning and refrigeration applications as claimed in claim 1, wherein said selected temperature signal is a preset temperature signal.

16. A multi-stage compressor pump driving system for air conditioning and refrigeration applications as claimed in claim 1, wherein said central controller is arranged to control said driving control device according to at least one of the following operating modes:
   a. a low speed operating mode suitable for use under conditions of moderately varying temperature in which, when a target surrounding temperature indicated by said actual temperature signal is higher than a preset level indicated by said selected temperature signal, the compressor pump is driven by the driving device at said second predetermined speed until the target surrounding temperature is reached, after which the compressor pump is driven at said first predetermined speed and, if the target surrounding temperature is lower than said target surrounding temperature, said compressor pump is stopped until the target surrounding temperature is again higher than said preset level, at which point the compressor pump is again driven at said second predetermined speed until the target surrounding temperature is reached, and then is again driven at the first predetermined speed;

b. a low speed constant temperature operating mode suitable for use under conditions of constant temperature in which, when the target surrounding temperature is higher than a preset level, the compressor pump is driven by the driving device at said second predetermined speed until the target surrounding temperature is reached, after which the compressor pump is driven at said first predetermined speed and, if the target surrounding temperature is lower than the preset level, said compressor pump is stopped until the target surrounding temperature is reached, at which point the compressor pump is driven at the first predetermined speed;

c. a high speed operating mode suitable for use under conditions of highly variable temperature in which, whenever the target surrounding temperature is higher than said preset level, said compressor pump is operated at high speed until said target surrounding temperature reaches or is lower than said preset level, at which time said compressor pump is stopped.

17. A multi-stage compressor pump driving system for air conditioning and refrigeration applications as claimed in claim 1, wherein said compressor pump is an air conditioner compressor pump, and further comprising an interface driving circuit arranged to receive operating signals from the central controller to control an operating time of the air conditioner and further to control a fan and a display device.

* * * * *